United States Patent Office 3,482,988
Patented Dec. 9, 1969

3,482,988
METHOD OF STABILIZING FREEZE-DRIED COFFEE EXTRACT
William W. Kaleda, Washington Township, N.J., assignor to General Foods Corporation, White Plains, N.Y., a corporation of Delaware
No Drawing. Filed Sept. 16, 1964, Ser. No. 397,017
Int. Cl. A23f 1/08
U.S. Cl. 99—71          5 Claims

ABSTRACT OF THE DISCLOSURE

Freeze-dried coffee extract is stabilized by reacting unstable aromas present in said extract with a starch prior to freeze-drying. The starch-aroma complex may then be retained in the extract and freeze-dried (for release on reconstitution with hot water) or it may be removed from the extract prior to freeze-drying.

---

This invention relates to improving the stability characteristics of aromatized freeze-dried soluble coffee.

The use of conventional spray drying techniques for the production of soluble coffee from aqueous extracts of coffee has disadvantages relative to retaining volatile aromatics, particularly those volatiles which vaporize or "boil off" at temperatures below 212° F. Flash evaporation of the water present in the aqueous extract when spray drying accomplishes almost a complete stripping of the desirable volatile flavors thereby giving a final soluble coffee product which could be considered relatively de-aromatized. Addition of aromas in the form of concentrates to the extract prior to spray drying has met with little success due to loss of these volatiles during the high temperature drying conditions employed while spray-drying. Alternatively, the soluble coffee has been improved in flavor by the addition of concentrated aromas, such as expressed coffee oil or steam distilled aroma fractions, to the extract by coating or plating the aromas on the dried soluble coffee. However, this latter procedure has resulted in loss of aromas due to evaporation as well as stability problems during storage. In contrast to the above methods, the use of freeze-drying has the advantages of subliming the water in the frozen state from the extract thereby preserving to a high degree the volatile aromatics present in the coffee extract. These volatiles may be aromas originally present in the extract or aromas overtly added to the extract, such as steam distilled aromas. However, the high retention of volatile aromatics by the use of this technique has presented stability problems in the final dried product. These stability problems are believed to be due in part to the presence of aromatic compounds containing reactive carbonyl or aldehyde groups, e.g., acetaldehyde, propionaldehydeacetone, isobutylaldehyde, methyl ethyl ketone, isovaleraldehyde, etc. These carbonyl containing aromas react or decompose on standing for only a short period of time to produce stale or rancid notes which completely overcome the flavor advantages produced by the remaining volatile aromatics. Attempts to selectively remove or stabilize the reactive carbonyl groups while still preserving the flavor advantages of the remaining volatiles have been unsuccessful.

It would, therefore, be highly desirable if a simple method could be employed for stabilizing the reactive carbonyl groups of the volatile aroma components retained during freeze-drying of an aromatized extract of coffee while at the same time retaining the flavor advantages of these aromatics on reconstitution.

This invention relates to improving the stability of an aromatized freeze-dried coffee extract by a process which comprises incorporating a sufficient quantity of starch or a starch derivative in contact with a liquid extract having aromatic carbonyl containing compounds to thereby react the carbonyl compounds in the aromas with the hydroxyl groups in the starch to form relatively stable acetal groups. The stabilized extract may then be frozen and freeze-dried to yield a stable soluble coffee of improved flavor.

The term "freeze-dried coffee" as used in this invention refers to coffee that has been dried in the frozen state by sublimation.

The amount of starch material to be incorporated with the volatile aroma fraction will vary with the number of carbonyl or aldehyde groups to be stabilized. Equal parts by weight of starch and concentrated aroma may be mixed together to stabilize the aromas. The search fraction may then be removed or added together with the stabilized concentrate to the main body of coffee extract. In the addition of stabilized starch-aroma mixtures to the main body of coffee extract, amounts by weight of starch in excess of 15% by weight of the coffee are preferably avoided and a preferred range of starch in the final product should be 0.5 to 8% by weight of the coffee solids. Alternatively, the volatile aromas may be stabilized after combining the aromas with the main body of coffee extract and in this latter case, about 0.5 to 8% by weight of starch is usually sufficient to stabilize the ultimate freeze-dried product produced. While various starches may be used, it is preferable to use a starch or starch derivative which does not gelatinize at normal reconstitution temperatures while having hydroxyl groups available for reaction with the aldehyde or carbonyl groups of the coffee aromas. The modified starches also should not present problems of off-tastes or sedimentation upon reconstitution of the freeze-dried product.

It is theorized that the carbonyl groups of the aromatic compound react with the hydroxyl groups of the starch to give esters (acetals) and partial esters (hemi-acetals) which can be easily released on hydrolysis. However, such acetals and hemi-acetals are relatively stable during the ordinary shelf life of a freeze-dried coffee and effectively serve to prevent early deterioration of the aromas retained during freeze-drying.

The extract of this invention is aromatized by removing the desirable aromatic constituents from freshly roasted and ground coffee and combining these desirable aromas with either conventional or de-aromatized coffee extract, which is then frozen and freeze-dried. In freeze-drying, a vacuum of less than 500 microns, preferably 100–250 microns, and a sublimation temperature which is below −14° F. is used. During freeze-drying the temperature of the dried portion of extract should be kept below 110° F. to preserve the volatile aromas which have not reacted with the starch solids.

In aromatizing the aqueous extract of coffee it is possible to use a large number of aromas. The coffee aromas suitable for use in this invention are the steam distilled aroma fractions such as those identified in U.S. Patent 3,132,947 to Mahlmann and U.S. Patent 2,562,206 to Nutting; dry vacuum distilled aromas, such as those described in U.S. Patent 2,680,687 to Lemonnier; grinder gas which is collected during the grinding of freshly roasted coffee; and coffee oil, such as expressed coffee oil obtained from roasted coffee by a process such as that described in U.S. Patent 2,947,634 to Feldman et al.

As indicated, the starch may be incorporated directly with the aroma concentrate before addition to the main body of extract or incorporated in the extract after addition of the aroma fraction to the aqueous extract and may be filtered and separated from the extract or remain in the extract to be freeze-dried along with the extract. In order to avoid the retention of any non-coffee material in the final dried product, it is preferred to filter off the starch material after it has been reacted with the unstable aromas.

In the case of steam distilled aromas, these aromas are usually obtained by introducing the steam into an elongated column containing a bed of ground and roasted coffee in order to generate the volatile components under a process of reflux and rectification that collaterally removes undesirable organic substances. The volatile fraction obtained may be fractionated or unfractionated. Fractionation permits the removal of undesirable organic acidic components and other non-volatile organics, as well as water, and the steam volatile flavor component is usually concentrated to about 5 times that of the normal steam distilled aroma. The condensate obtained contains a high percentage of carbonyl type aromas. These aromas, whether fractionated or unfractionated, may then be stabilized by addition of starch to the condensate, say 10–20% by weight starch to 80–90% by weight condensate. The mixture is then slurried or agitated for a period of time, say 10–30 minutes, under a blanket of inert gas such as nitrogen, argon, helium or carbon dioxide, combined with the aqueous extract, frozen, and then freeze-dried.

The coffee oil which is used may be expressed coffee oil which is first homogenized with a small portion of extract before it is added to the main body of coffee extract. The starch, say about 20% by weight of the oil is preferably added during homogenization of the oil while the mixture is being agitated at a pressure of about 1000–3000 p.s.i.g. Pressures of below 1000 p.s.i.g. should preferably be avoided since such pressures result in some separation of oil from the extract. However, the starch may be incorporated directly with the coffee oil prior to homogenization.

In the case where the starch material used tends to give off-tastes or undesirable properties upon reconstitution, it may be desirable to remove the starch solids after they are slurried with the extract or volatile aroma fraction. This procedure is not necessary when the starch component used is tasteless and does not gelatinize upon reconstitution. Modified starches such as those containing 96% amylopectin and 4% amylose are in this category. Amylopectin is a branched chain polymer consisting of 1500 or more glucopyranose units while amylose is a linear polymer consisting of 200 to 1000 glucopyranose units. When the starch is not desired in the final product, the extract with the overtly added aroma fraction may be percolated through a starch column for several minutes while the percolation temperature is kept at below the gelatinization point of the starch or may be filtered for removal of the starch.

This invention will now be described by reference to the following specific example.

EXAMPLE

About 4000 ml. of aqueous coffee extract obtained by conventional commercial extraction and having a soluble solids concentration of 27% was mixed in a homogenizer with 80 ml. of expressed coffee oil and about 11 gms. of corn starch (96% amylopectin and 4% amylose) at a pressure of 1500 p.s.i.g. while protected with a nitrogen gas atmosphere. Steam distilled aromas obtained by steaming an elongated bed of roasted and ground coffee to obtain a reflux and rectification of the bed according to the process disclosed in U.S. Patent 3,132,947 to Mahlmann, issued May 12, 1964, were then blended into the homogenized extract and starch mixture at a level of about 8 ml.

The aromatized extract was then frozen to well below its eutectic point of $-10°$ F. and freeze-dried in a commercial freeze-dryer under a vacuum of less than 300 microns and a sublimation temperature below $-10°$ F. while keeping the temperature of the dried portion of the extract below $110°–120°$ F.

The freeze-dried coffee was removed from the dryer under ambient conditions of $85°$ F. and 40% relative humidity and ground to a particle size which resembled roasted and ground coffee. The coffee was then packaged under inert conditions and stored in a $110°$ F. storage cabinet. The total exposure time was 45 minutes.

After 7 weeks of storage the above product developed no significant off-flavors or rancid notes and reconstituted to a flavorful and aromatic cup of coffee having no off-flavors. A control sample processed in the same manner without the starch as a stabilizer developed significant off-flavors after several days and the reconstituted sample had significant off-tastes.

What is claimed is:

1. A process for stabilizing carbonyl containing aromas in an aqueous extract of soluble coffee solids which comprises reacting said carbonyl containing aromas with an ungelatinized modified corn starch containing about 96% amylopectin and 4% amylose to form acetals and hemiacetals, said starch being added to the extract at a level of between 0.5 to 15% by weight of the soluble solids present in said extract, freezing said extract, and then freeze-drying the frozen extract to obtain a freeze-dried coffee with stable starch-aroma complexes releasable on reconstitution with hot water.

2. The process of claim 1 wherein the starch is present at a level of 0.5 to 8% by weight of the soluble coffee solids.

3. The process of claim 2, wherein the extract contains volatile steam aromas.

4. A process for removing unstable carbonyl-containing aromas from an aqueous extract of soluble coffee solids which comprises reacting said unstable carbonyl aromas with an ungelatinized starch to form a starch-aroma complex, removing said starch-aroma complex from the extract, freezing the extract, and then freeze-drying the stabilized extract.

5. The process of claim 4 wherein the extract containing the unstable aromas is percolated through an ungelatinized starch filter to cause reaction of the starch with the unstable aromas.

References Cited

UNITED STATES PATENTS

| | | | |
|---|---|---|---|
| 2,305,620 | 12/1942 | Kremers | 99—140 |
| 2,827,452 | 3/1958 | Schlenk et al. | 260—209 |
| 3,244,531 | 4/1966 | Clinton et al. | 99—71 |

MAURICE W. GREENSTEIN, Primary Examiner

U.S. Cl. X.R.

99—140, 152